Figure 1:
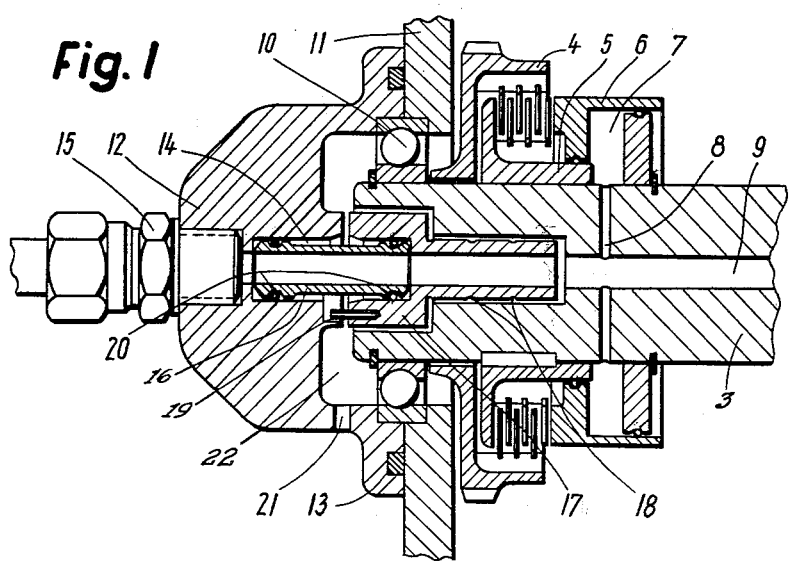

April 21, 1964 R. SCHRODT 3,129,960
DEVICE FOR FEEDING PRESSURE FLUIDS FROM A STATIONARY
BEARING COVER INTO THE OUTER END OF A ROTATING SHAFT
Filed Sept. 23, 1960 3 Sheets-Sheet 1

INVENTOR.
Rudolf Schrodt
BY
Bailey, Stephens & Huettig
ATTORNEYS

United States Patent Office

3,129,960
Patented Apr. 21, 1964

3,129,960
DEVICE FOR FEEDING PRESSURE FLUIDS FROM A STATIONARY BEARING COVER INTO THE OUTER END OF A ROTATING SHAFT
Rudolf Schrodt, Kronberg, Taunus, Germany, assignor to Reimers-Getriebe K.G., Ascona, Switzerland, a Swiss firm
Filed Sept. 23, 1960, Ser. No. 58,071
Claims priority, application Germany Oct. 1, 1959
5 Claims. (Cl. 285—95)

In the many types of machines, especially in hydraulically controlled gears, it is necessary to feed one or more pressure fluids from a stationary bearing cover into the outer end of a rotating shaft. These pressure fluids may partly serve for lubrication and partly for the operation of pressure-controlled multiple-disk clutches, brakes, or other rotating control means.

It has so far been conventional to seal the connecting inlet of the pressure fluid relative to the rotating shaft either by means of elastically deformable sealing rings or, without any contact, by so-called sealing joints or glands. When using elastic sealing rings, the disadvantage occurs that the sealing material becomes heated and worn. The mechanical efficiency of such sealing means is rather poor and the highest admissible speed of the shaft must be limited to a value which is insufficient for many purposes. Furthermore, such elastic sealing rings only permit the transmission of relatively low fluid pressures.

The non-contacting sealing joints or glands, on the other hand, require a very accurate alignment with the shaft and a very accurate mounting of the shaft, especially if the pressure fluid is supplied under a very high pressure. This requires an exceedingly high accuracy of manufacture which renders such pressure inlets which are provided with noncontacting sealing joints very expensive. Furthermore, if radial forces act upon the shaft, the same may bend so that the accurate alignment with the bearing cover will not be maintained and seizing of the shaft or leaking of pressure fluid may occur.

It is an object of the present invention to provide a pressure-fluid feeding and sealing device which overcomes the mentioned disadvantages of the known devices and permits one or more pressure fluids to be conducted from a stationary bearing cover into the free tubular end of a rotating shaft, and which may be inexpensively produced and also permits the pressure fluids to be fed into the shaft even though the latter is driven at a very high speed.

This object is attained according to the invention by providing a sealing element which has at least one axially extending inlet bore and is nonrotatably mounted relative to and coaxially with the shaft. In cooperation with a cylindrical surface which is rotatable with the shaft, this sealing element forms a noncontacting sealing joint. Between the stationary bearing cover and the rotating shaft at least one further sealing member is provided which extends coaxially to the shaft and is pivotably suspended within a relatively stationary part by means of an elastically deformable sealing ring.

This additional sealing member which is interposed between the bearing cover and the shaft prevents any possible wobbling or eccentric movements of the rotating shaft from affecting the noncontacting sealing joint.

The sealing element and the sealing member may be arranged relative to each other in such a manner that the sealing member which forms a cylindrical sleeve is mounted on or within the end of the shaft so as to be axially nonslidable and nonrotatable relative thereto but so as to be pivotably suspended thereon, and so that one of the cylindrical surfaces of this sealing member is disposed relative to a cylindrical surface of the sealing element which is secured in a fixed position in the bearing cover so that both surfaces together form the noncontacting sealing joint. The sealing member may be mounted either on the front end of the shaft or within the axial bore in this end portion of the shaft. In the first case, the sealing element extends loosely over the sealing member so as to form with the latter the noncontacting sealing joint, while in the second case the sealing element extends into the cylindrical bore in the sealing member. The sealing member is preferably connected at one end to the shaft by means of an elastically deformable sealing ring and it is secured against rotation relative to the shaft by a pin which extends into a recess in the shaft, while a spring ring is mounted within the outer end of the shaft for preventing the sealing member from shifting in the axial direction. This sealing member then fits loosely over the end of the shaft or into the bore therein so as to be able to pivot relative to the shaft and to to prevent any oscillating or wobbling movements of the shaft as well as any eccentric movements thereof which may be due to the elasticity of the sealing rings from affecting the noncontacting sealing joint.

According to a preferred embodiment of the invention, the sealing element forms the noncontacting sealing joint directly in cooperation with a rotating cylindrical surface of the shaft, and the pressure fluid is conducted from the bearing cover to this sealing element by passing through an inlet bore in at least one sealing member which is pivotably suspended within the bearing cover and also within the front end of the sealing element by means of elastically deformable sealing rings. In this case, a noncontacting sealing joint which is formed between the relatively movable surfaces and a sealing joint which is formed between relatively stationary surfaces and is effected by the deformation of elastic sealing rings are provided in series behind each other, and the sealing element and the sealing member are flexibly connected to each other so that any possible wobbling or eccentric movements of the shaft will not affect the noncontacting sealing joint. The end surfaces of the sealing element and sealing members which are exposed to the action of the pressure fluid are preferably made of such dimensions that an axial force will act upon the sealing element in the direction toward the bearing cover. The sealing element which forms the noncontacting sealing joint may either engage over the end of the shaft or project into a bore in the end of the shaft.

Generally speaking, it is more advisable to provide the sealing element and possibly also the sealing member at the inside of a bore in the end of the shaft since this will result in a structure of a shorter length.

If several pressure fluids are to be conducted into the rotating shaft separately from each other, the sealing element is provided with several inlet bores for the different pressure fluids which are then passed to the inlet bores through a corresponding number of sealing members which are pivotably suspended in the bearing cover and in the front end of the sealing element. At least one of several inlet bores in the sealing element is then preferably made so as to form a continuous axially extending bore, while each of the others terminates into an annular groove in the peripheral surface of the sealing element from which each particular fluid then enters into the shaft through a bore which extends at first in a radial direction and then in the axial direction of the shaft.

These and other objects, features, and advantages of the present invention will become further apparent from the following detailed description thereof, particularly when the same is read with reference to the accompanying drawings, in which—

FIGURES 1 to 5 illustrate five different embodiments of the device according to the present invention, each drawing being a central longitudinal section of the shaft end and the bearing cover of the respective device.

Referring first to FIGURE 1 of the drawings, a shaft 3 carries a gear 4 which is rotatably mounted thereon, and a multiple-disk clutch 5, one set of disks of which is rigidly connected to shaft 3, while the other is connected to the gears 4 for connecting the gear to the shaft and for disengaging it therefrom by means of a piston 6 which is slidable in the axial direction by a suitable pressure fluid which may be supplied to an annular pressure chamber 7 through a longitudinal bore 9 and radial bores 8 in the rotatable shaft 3.

This longitudinal bore 9 in shaft 3 has been illustrated in the drawing as extending beyond clutch 5 in order to indicate that additional devices which may be operated by the pressure fluid may also be mounted on shaft 3. Shaft 3 is rotatably mounted in a housing 11 by means of a ball bearing 10. A bearing cover 12 is bolted to the housing and sealed relative thereto by a gasket 13, and it is further provided with a bore 14 which extends coaxially to bore 9 in shaft 3 and serves as an inlet into which the connecting piece 15 of a pressure line is screwed.

Bore 9 in shaft 3 is provided with an enlarged socketlike end portion into which a tubular sealing element 17 is inserted in such a manner that the outer surface of the sealing element and the surface along the inner wall of the socketlike bore are separated from each other by a narrow annular gap which forms a non-contacting sealing joint. The sealing effect may be further increased by providing the outer surface of the sealing element with one or more annular grooves 18 which are also adapted to take up any dirt particles which might enter with the pressure fluid or from the outside. Sealing elements 17 is secured against rotation relative to housing 11 by a pin 19 and it has an inlet bore which has substantially the same diameter as bore 9 in shaft 3 and extends coaxially thereto. The pressure fluid is passed from bearing cover 12 to sealing element 17 through a further tubular sealing member 16 which is loosely inserted at one end into bore 14 in bearing cover 12 and at the other end into a bore in the front end of sealing element 17, and which is sealed near both ends relative to the inner walls of the mentioned bores by elastic sealing rings 20 so that, if shaft 3 should be slightly displaced in a direction parallel or at an angle to bearing cover 12 or even in the longitudinal direction thereof, sealing member 16 will act like a flexible joint and still maintain a proper sealing effect. The annular sealing gap between sealing elements 17 and the wall of bore 9 in shaft 3 permits the shaft to be driven at a high speed. Furthermore, since any possible displacement of the shaft will not affect the sealing gap because of the pivotable suspension of the sealing member 16 in bearing cover 12 and in the front end of the sealing element 17, the sealing gap may be made very narrow so as to permit high pressures to be transmitted. Due to the pivotable suspension of sealing member 16, it is also immaterial whether or not shaft 3 is accurately aligned thereto, and it is therefore unnecessary to make any particular effort to center bearing cover 12 relative to the shaft.

In order to avoid any throttling losses, the bores in sealing member 16 and sealing element 17 are made of the same diameter as bore 9 in shaft 3. The part of sealing element 17 which is provided with the annular grooves 18 is preferably made of a slightly greater diameter than that of bore 14 in the bearing cover. Due to the effect of the pressure fluid upon the end surfaces of sealing member 16 and sealing element 17 an axial force will be produced which tends to force sealing element 17 out of bore 9 in shaft 3 and thereby prevents the occurrence of any axial friction between the annular end surface of sealing element 17 and shaft 3. Bearing cover 12 is provided with a chamber 22 for collecting the fluid which has leaked past sealing element 17 and which may then be discharged through an opening 21.

Figure 2:
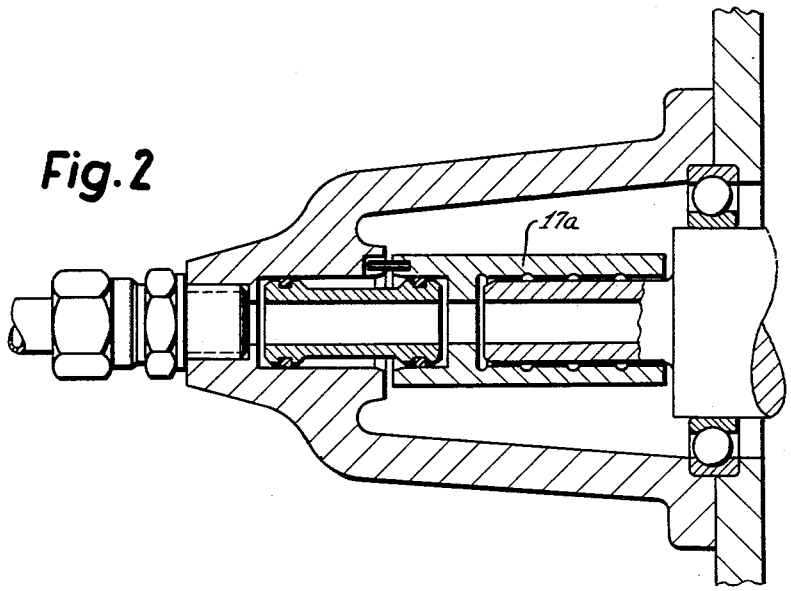

The embodiment of the invention as illustrated in FIGURE 2 differs from that according to FIGURE 1 only insofar as the bearing cover is of a different shape and sealing element 17a fits over rather than into the shaft. The manner of operation of this embodiment is, however, the same as that according to FIGURE 1.

Figure 3:
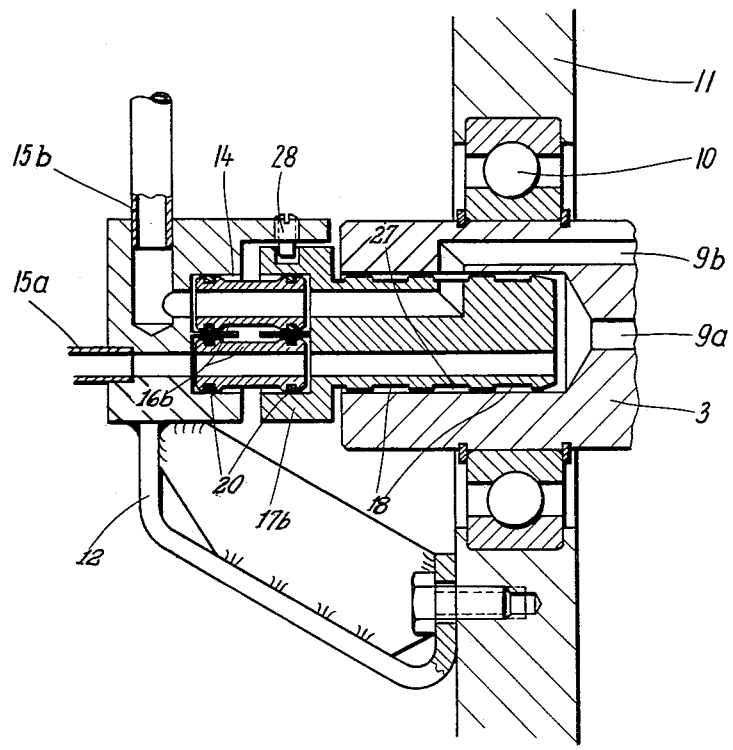

FIGURE 3 shows a modification of the embodiment according to FIGURE 1, in which two or more pressure fluids may be passed separately from each other into shaft 3. Sealing element 17b is in this case provided with two inlet bores, one of which communicates with a central longitudinal bore 9a and the other with an eccentric bore 9b in shaft 3. The second inlet bore in sealing element 17b terminates into an annular groove 27 in the outer wall of the sealing element from which the fluid then enters into bore 9b of the shaft through a short radial end portion thereof. The bearing cover is provided with two bores 14 and the front end of sealing element 17b with two corresponding bores. Into each pair of these aligned bores a sealing member 16b is inserted in the same manner as shown in FIGURES 1 and 2, and these two sealing members are likewise pivotably suspended within the bores by means of elastically deformable sealing rings 20. The respective pressure fluids are passed into the bores 14 in the bearing cover through connecting pieces 15a and 15b of two separate pressure-fluid lines. In this embodiment, the bearing cover has not been particularly centered on the housing since, by the inventive arrangement of the sealing members 16b and sealing elements 17b in series behind each other, a fully Cardanic suspension of sealing element 17b is attained so that an accurate alignment between the bearing cover and the shaft is not required. In this embodiment, sealing element 17b is secured against rotation and against shifting in the axial direction by means of a radially extending screw 28.

Figure 4:
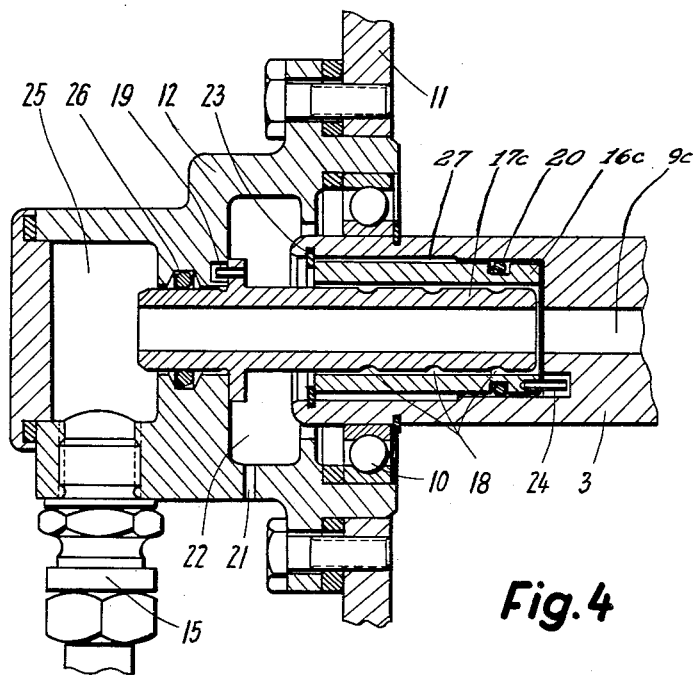
Figure 5:
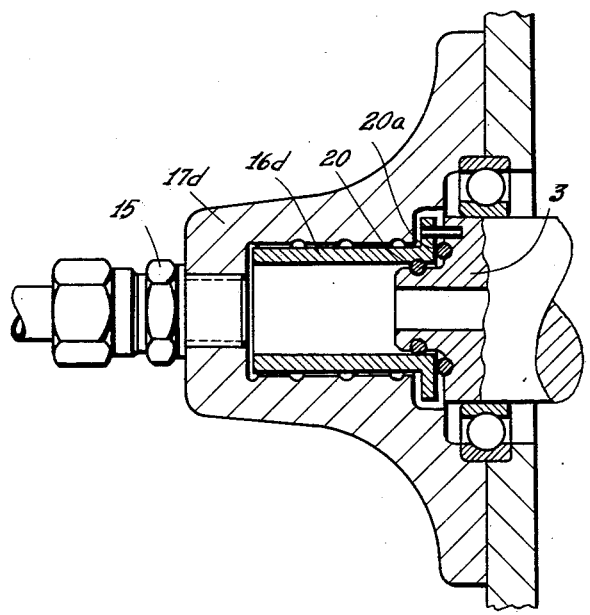

FIGURES 4 and 5 illustrate two further embodiments of the invention, in which the sealing element and the sealing member are arranged in a relation to each other which differs from those shown in FIGURES 1 to 3. In FIGURE 4, sealing member 16c is pivotably suspended within the enlarged socketlike part of bore 9c in shaft 3 by means of a sealing ring 20 and a pin 24 which engages into a recess in the bottom of the enlarged part of the bore secures sealing member 16c against rotation relative to the shaft, while a spring ring 23 prevents it from shifting in the axial direction. In order to permit sealing member 16c to move within the enlarged part of the bore in shaft 3, this enlarged part is still further enlarged at 27. Sealing element 17c which is provided with annular grooves 18 is fitted into sealing member 16c so that both together form a non-contacting sealing joint. Sealing element 17c is secured against rotation relative to bearing cover 12 by a pin 19, and its outer end projects through a partition between chamber 22, for collecting any leakage of fluid, and a chamber 25 into which the pressure fluid is passed through a connecting piece 15. Sealing element 17c may either be pressed fluid-tight into the partition of the bearing cover, or, as shown in FIGURE 4, it may be secured therein by means of an elastic sealing ring 26. Even if sealing element 17c is rigidly connected to bearing cover 12, changes in position of the shaft will not be transmitted to the noncontacting sealing joint since sealing member 16c is pivotably suspended in the bore of the shaft. The pressure fluid which is passed from chamber 25 through the tubular sealing element 17c into bore 9c of the shaft is prevented from emerging into collecting chamber 22, on the one hand, by the surfaces of sealing element 17c and sealing member 16c which are movable relative to each other and form the noncontacting sealing joint, and, on the other hand, by the elastic sealing ring 20 which is provided between the enlarged part of bore 9c of the shaft and sealing member 16c which is stationary relative to the shaft.

The embodiment of the invention as illustrated in FIGURE 5 differs from that according to FIGURE 4 insofar as the sealing element and the sealing member are not disposed within a bore in shaft 3, but on the shaft. Sealing member 16d is pivotably suspended on shaft 3 by means of an elastically deformable sealing ring 20 and it engages with the flange on the shaft through an elastic ring 20a. Sealing element 17d which engages over sealing member 16d, and both of which together form the noncontacting sealing joint, is in this embodiment designed so as also to form the bearing cover. The pressure fluid is supplied to shaft 3 through a connecting piece 15.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination, a frame, a shaft having one end mounted in the frame for rotation about an axis and having at least one bore therein opening in said end, a sealing element part concentric and interfitting with the shaft and having a bore therethrough, said sealing element part being nonrotatable with respect to the frame, the interfitting sections of said shaft and said sealing element part having opposed slightly spaced cylindrical surfaces to form a noncontacting sealing joint, a sealing member part concentric with the shaft and in alignment with said sealing element part having a bore therethrough communicating with said bores of the two other parts, said sealing element part and said sealing member part interfitting with each other, elastically deformable sealing ring means engaged between the parts mounting the sealing member part rockably with respect to said sealing element part at a point spaced in the direction of the longitudinal axis of the sealing element part from the area of said sealing joint, and means rockably mounting said sealing member part in said frame, whereby to prevent disturbance of said sealing joint by longitudinal eccentric and wobbling motions of said shaft.

2. In a device as claimed in claim 1, a second bore in said sealing element part, a second bore in said shaft, both said bores communicating with said sealing joint, and a second sealing member part rockably mounted with respect to the sealing element part and frame having a bore therein communicating with said second bores.

3. A device as claimed in claim 1, in which the sealing element part engages over the end of the shaft.

4. A device as claimed in claim 1, in which said sealing element part is located within the bore in the end of the shaft, and in which such sealing member part projects into the cylindrical bore in the sealing element part.

5. A device as claimed in claim 1, in which said sealing member part has a surface exposed to the force of pressure fluid within said bores, said surface extending transversely with respect to the shaft axis, so that the fluid exerts a pressure on said sealing member part forcing the same away from the shaft and toward the frame.

References Cited in the file of this patent

UNITED STATES PATENTS

| | | |
|---|---|---|
| 1,425,635 | Dod | Aug. 15, 1922 |
| 2,123,818 | Wegman | July 12, 1938 |
| 2,453,428 | Gordon | Nov. 9, 1948 |
| 2,496,569 | Tremolada | Feb. 7, 1950 |
| 2,590,512 | Crain | Mar. 25, 1952 |
| 2,653,041 | Wilson | Sept. 22, 1953 |
| 2,701,146 | Warren | Feb. 1, 1955 |